Aug. 13, 1946.　　　　R. E. GRAY　　　　2,405,648
TAPER HOLE GAUGE
Filed May 18, 1944
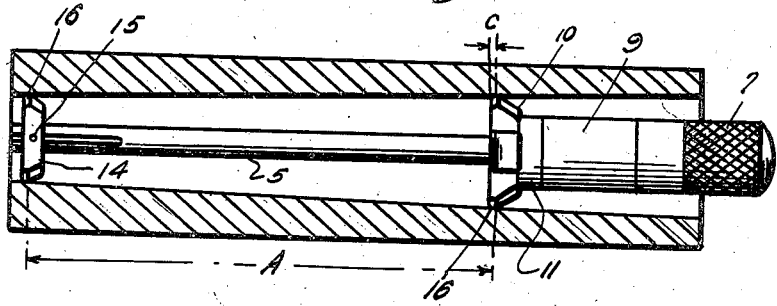
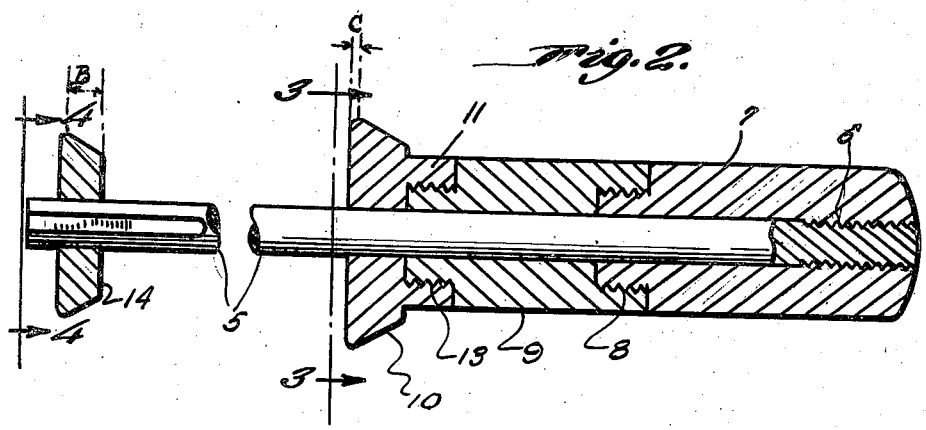
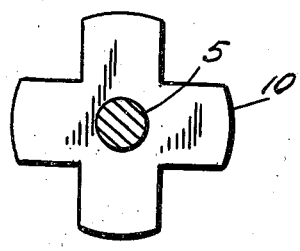　　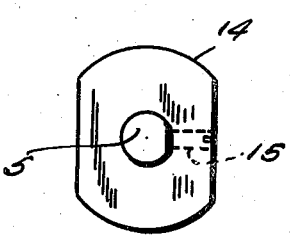
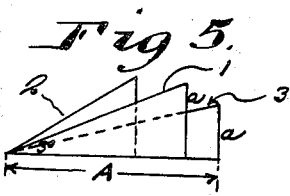
Inventor
Robert E. Gray
By Clarence A. O'Brien
and Harvey B. Jacobson
Attorneys Patented Aug. 13, 1946

2,405,648

UNITED STATES PATENT OFFICE 2,405,648

TAPER HOLE GAUGE

Robert E. Gray, Detroit, Mich.

Application May 18, 1944, Serial No. 536,174

2 Claims. (Cl. 33—174)

This invention relates to taper hole gauges, and the primary object of the invention is to provide a simple and efficient means for readily and accurately determining the distance between two different diameters of a taper hole to thereby facilitate correction of any mistake in the taper of the hole.

The above object is attained by means of a gauge having spaced feeling plates or contacts of known different diameters, means being provided for effecting a fine adjustment of one feeling plate or contact relative to the other, and an indicator for fine indication being used to show the distance between the feeling plates or contacts in any position of adjustment of the one plate or contact relative to the other.

The exact nature of the present invention, as well as other objects and features thereof, will become apparent from the following description when considered in connection with the accompanying drawing.

In the drawing, wherein like reference characters indicate corresponding parts throughout the several views:

Figure 1 is a side elevational view of a taper hole gauge constructed in accordance with the present invention, the gauge being shown as it appears in use in the taper hole of a piece of work.

Figure 2 is an enlarged central longitudinal sectional view of the gauge per se, partly broken away.

Figure 3 is a transverse section taken on line 3—3 of Figure 2.

Figure 4 is an end view looking in the direction of the arrows of line 4—4 of Figure 2.

Figure 5 is a diagrammatic view illustrating a step in determining the correction that is required in the taper of the hole, subsequent to use of the present gauge.

Referring in detail to the drawing, the present gauge includes a relatively long stem 5 provided at one end with a fine thread 6 and having a similarly internally threaded adjusting sleeve or spindle 7 adjustably threaded on this end. The sleeve or spindle 7 has a reduced inner end provided with a fine external thread 8. Another sleeve 9 of predetermined length is slidably fitted on the stem 5 and has a counterbored outer end detachably engaged with the threaded end of spindle 7. A relatively large feeling plate or contact 10 is also slidable on the stem 5 and has a reduced counterbored outer end portion 11 provided with a fine internal thread 13 to detachably receive a similarly threaded reduced inner end portion of sleeve 9. A second feeling plate or contact 14 of known size and smaller than the plate or contact 10 is keyed on the inner end of stem 5 and adjustable longitudinally of the latter. The plate or contact 14 has a set screw at 15 to secure the same in any desired position which it is adjusted longitudinally of stem 5. Also, the contacts 10 and 14 have contact surfaces of predetermined width at 16.

In practice, there will be a set of the feeling plates or contacts 10 ranging from a predetermined smallest outside diameter to a predetermined largest outside diameter. Similarly, there will be a set of the feeling plates or contacts 14 which are smaller than those of the set of contacts 10 and whose outside diameters may range from .200 of an inch to 2 inches. The thickness of each contact must be exactly the same. Still further, there are a set of the sleeves 9 of predetermined different lengths so as to compensate for the difference in distances at which the elements 10 and 7 are set relative to each other for different tapers. It will be apparent that when the adjusting spindle 6 is turned, the contact 10 is adjusted toward or from the contact 14 so as to effect a snug engagement of the contact 10 with the wall of the taper hole at a predetermined diameter thereof when the contact 14 simultaneously engages the wall of the hole at a smaller diameter of the same. In use, a small and a large contact is selected and made a part of the gauge. The distance A indicated in Figure 1 is a chosen distance or the correct distance for the taper to be made, such distance being checked with Johansson blocks. Contact 14 has a decimal dimension measuring from the center of the radius to the back of the contact, as shown at B in Figure 2. As previously pointed out, the width C of the contact 10 must also be a correct dimension, as it is included in the distance A. Continuing use of the gauge, it may be assumed that the distance A is 3 inches; that distance B equals .175 of an inch, and that distance C equals .012 of an inch. Distance B plus distance C equals .187 of an inch, and deducting this from the 3-inch dimension of distance A would leave 2.813 inches. If the taper were correct, the Johansson blocks would be set up to 2.813 inches. They are set between contacts 10 and 14, and if they read more or less than 2.813 inches, it will be known that the taper is incorrect. By applying trigonometry, using the distance that has been found, a machine operator would know where to set the dials of his machine in order to correct the taper. This will be apparent from Figure 5, wherein No. 1 is the true angle of the taper and Nos. 2 and 3 are incorrect angles. If a machinist wishes to cut a No. 4 Morse taper, the diameter of the small end of this taper may be .778 of an inch and the diameter of the large end may be .938 of an inch. The length of the taper is 3¼ inches, and for the small end of the taper a smaller contact 14 of .800 of an inch in diameter may be selected. For the larger end of the taper, a contact 10 may be selected whose diameter is .950 of an inch. A No. 4 Morse taper has a taper of .602 of an inch per foot, and to find the angle it is necessary to divide .601 by 2 which equals .301. The resultant or .301 is then divided by 12 and gives .02508. Looking in the trigonometric function table under the tangent of angles, it is found that the angle is to be one degree, 26 minutes. The difference is then found between the gauges as .150 of an inch (.950−.800=.150). Dividing .150 by 2 equals .075, and to find length A in Figure 1, the following formula is used:

$$A = .075 \times \text{cotangent of } 1°, 26'$$
$$A = 2.897$$

The added distance on the gauge of .187 of an inch is known, and it was found by adding length B and C, as previously described. The resultant 2.897−.187=2.710, and this is the reading which should be gotten with the Johansson blocks. The machinist is now ready to cut a taper, and after it is cut, he proceeds to check it with the taper hole gauge by placing it in the hole he has cut. Contact 10 is moved on stem 5 by turning spindle 7 until the proper fit of the gauges is obtained in the walls of the hole. The machinist then removes the gauge and checks the distance with the Johansson blocks. As an example, it may be assumed that the reading of 2.840 inches was obtained with the Johansson blocks, in which event the correct reading of 2.710 inches is to be considered. The length of 2.840 gives the angle 3 of Figure 5, and by trigonometric functions, the machinist can find the difference between the sides $a$ of the triangles 1 and 3. This will tell where to set the dials of the hole-forming machine so as to correct the angle of the hole.

From the foregoing description, it is believed that the construction and operation, as well as the advantages of the present invention will be readily understood and appreciated by those skilled in the art. Minor changes in details of construction illustrated and described are contemplated, such as fall within the spirit and scope of the invention as claimed.

What I claim is:

1. A taper hole gauge comprising an elongated stem having a threaded end portion and smooth throughout the remaining major portion thereof, a removable feeling contact having a central opening slidably receiving the other end portion of said stem, means to secure said contact in adjusted position relative to said stem, a spindle adjustably threaded on said threaded end portion of the stem, a second removable feeling contact of larger diameter than the first-named contact rotatably and slidably fitted on said stem between the first named contact and said spindle, a removable sleeve rotatably and slidably fitted on the stem between the second named contact and said spindle, and means separably connecting the opposite ends of said sleeve respectively to the adjacent ends of second named contact and the spindle.

2. A taper hole gauge comprising an elongated stem having a threaded end portion and smooth throughout the remaining major portion thereof, a removable feeling contact having a central opening slidably receiving the other end portion of said stem, means to secure said contact in adjusted position relative to said stem, a spindle adjustably threaded on said threaded end portion of the stem, a second removable feeling contact of larger diameter than the first-named contact rotatably and slidably fitted on said stem between the first named contact and said spindle, a removable sleeve rotatably and slidably fitted on the stem between the second named contact and said spindle, and means separably connecting the opposite ends of said sleeve respectively to the adjacent ends of second named contact and the spindle, said last named means embodying coacting elements on the adjacent ends of the second contact and the spindle for directly separably connecting them upon removal of the sleeve from the stem.

ROBERT E. GRAY.